United States Patent
Hayashi et al.

[11] Patent Number: 5,832,949
[45] Date of Patent: Nov. 10, 1998

[54] CONTROL VALVE

[75] Inventors: Tetsuji Hayashi; Toshihiro Yamada, both of Gifuken, Japan

[73] Assignee: Kayaba Industry Co., Ltd., Tokyo, Japan

[21] Appl. No.: 594,832

[22] Filed: Jan. 31, 1996

[51] Int. Cl.[6] .................................................. G05D 11/03
[52] U.S. Cl. .................................. 137/115.05; 137/115.1
[58] Field of Search ....................... 137/115.05, 115.09, 137/115.1

[56] References Cited

U.S. PATENT DOCUMENTS 4,396,033  8/1983  Narumi et al. .................. 137/115.09 X
4,570,667  2/1986  Masica et al. .................. 137/115.05 X Primary Examiner—Stephen M. Hepperle
Attorney, Agent, or Firm—Steinberg & Raskin, P.C.

[57] ABSTRACT

The invention provides a control valve wherein a restrictor can be formed simply in an oil passage for introducing pressure oil on the downstream side of an orifice into a pressure chamber. The control valve is generally constructed such that pressure oil on the downstream side of the orifice is introduced into the pressure chamber through the oil path and a spool is moved by an action of a pressure difference on the opposite sides of the orifice whereas an excessive flow mount of oil escapes to a tank port. A groove is formed along an insertion hole of a connector or on a tubular portion of an orifice member which overlaps with the insertion hole. Such groove may otherwise be formed both along the insertion hole and on the tubular portion. When the orifice member is inserted into a connector, a restrictor which makes part of the oil path is formed from the groove simultaneously.

10 Claims, 4 Drawing Sheets

CONTROL VALVE

BACKGROUND OF THE INVENTION

1. Field of the Invention

This invention relates generally to a control valve for use to supply pressure oil to a power steering apparatus, and more particularly to a connector structure of a control valve of the type mentioned.

2. Description of the Related Art

A typical one of conventional control valves is shown in longitudinal section in FIG. 5.

Referring to FIG. 5, a pump body 1 has a pump port P and a bypass port B formed therein and further has a spool hole 2 formed therein. A spool 3 is fitted for sliding movement in the spool hole 2. A connector 4 is inserted in an end portion of the pump body 1, and an actuator port 4a formed in the connector 4, the spool hole 2 and the pump port P cooperatively form a flow path, through which pressure oil from a pump not shown is supplied to a power steering apparatus not shown.

At the other end of the pump body 1, the spool 3 and the spool hole 2 cooperate with each other to form a pressure chamber 5. A compression spring 6 is accommodated in the pressure chamber 5 such that its spring force acts upon the spool 3.

An orifice member 7 is force fitted in the actuator port 4a of the connector 4, and a rod 8 secured to an end of the spool 3 extends through a center hole 7c formed in the orifice member 7. The orifice member 7 and the rod 8 cooperate with each other to form a variable orifice 9. Pressure oil on the downstream side of the variable orifice 9 is introduced into the pressure chamber 5 through a pilot passage.

The pilot passage is formed from a pressure sensing path 11 and an annular groove 18 formed in the connector 4 and a path port 19, a communication path 10 and a hole 12 formed in the pump body 1.

A relief valve formed from a spring 13, a ball support 14, a steel ball 15 and a seat member 16 is located in the spool 3.

It is to be noted that, while the control valve is shown incorporated in the pump body 1, it may otherwise be formed as an independent control valve.

In operation, when the pump not shown starts its rotation, pressure oil is supplied from the pump port P to the power steering apparatus not shown past the variable orifice 9 through the through-hole 4a.

In this instance, by such circulation of the pressure oil, a pressure difference is produced between the opposite sides, that is, the upstream and downstream sides, of the variable orifice 9. Then, the pressure on the upstream side of the variable orifice 9 acts upon the right-hand side end in FIG. 5 of the spool 3 while the pressure on the downstream side of the variable orifice 9 acts upon the left-hand end in FIG. 5 of the spool 3 through the pilot passage described above.

Then, as the speed of rotation of the pump P rises, the pressure difference on the opposite sides of the variable orifice 9 increases, and the spool 3 is moved leftwardly in FIG. 5 by the pressure difference. As the amount of movement of the spool 3 increases, also the opening of the communication path through which the pump port P and the bypass port B are communicated with each other increases, and consequently, the amount of pressure oil which escapes from the bypass port B increases as much.

However, when the load pressure on the through-hole 4a side rises in such a case as upon rest swinging of a steering elements also the pressure on the pressure chamber 5 side is raised by such pressure rise. Consequently, the spool 3 is moved back in the rightward direction in FIG. 5, whereupon the opening of the communication path between the pump port P and the bypass port B is decreased. In short, the spool 3 supplies a required flow rate of pressure oil to the steering apparatus side and allows an excessive flow rate of pressure oil to escape from the bypass port in response to the load pressure of the steering apparatus side.

As described above, the relief valve is located in the spool 3. Oil to be supplied to the power steering apparatus, that is, pressure oil in the pressure chamber 5, passes through a small through-hole 16a of the seat member 16 past a filter 17; and the pressure of the pressure oil acts upon the steel ball 15 seated on a seat face at an end of the small hole 16a.

Then, if the load to the power steering apparatus side rises until the pressure mentioned above becomes higher than a preset relief pressure value, the pressure oil pushes the steel ball 15 to open so that it escapes to the bypass port B through a path 3a in the spool 3. The relief pressure is set by the spring force of the spring 13, that is, the insertion position of the seat 16.

Further, when the relief valve is opened so that a large flow of pressure oil is produced in the pressure sensing path 11, the pressure of the pressure chamber 5 decreases suddenly. As a result, the spool 3 is moved by a great amount in the leftward direction in FIG. 5, and consequently, the pressure oil is allowed to escape by a greater amount to the bypass port B and the pressure of oil to be supplied to the power steering apparatus is prevented from being raised any more.

In the control valve of the construction described above, since the pressure sensing path 11 is formed by machining, accurate working is difficult, and much time is required for drilling or a different drilling operation is required for each different type of connectors. Further, where the pressure sensing path is formed by machining as described above, burrs are produced around an opening of the pressure sensing path. Consequently, an additional step for deburring is required, resulting in the problem of increase in number of steps of operation.

The increase in number of steps of working operation and the difficulty in working give rise to another problem in that the cost is increased as much.

SUMMARY OF THE INVENTION

It is an object of the present invention to provide a control valve wherein a pressure sensing path of a pilot passage for introducing pressure oil on the downstream side of an orifice into a pressure chamber can be formed simply without using drilling.

In order to attain the object described above, according to the present invention, there is provided a control valve, comprising a body having a pump port and a bypass port formed therein and further having a spool hole formed therein, a spool fitted for sliding movement in the spool hole of the body, a connector inserted in an end portion of the body and forming a flow path together with the pump port and the spool hole, an orifice member inserted in an insertion hole of the connector for providing an orifice intermediately in the flow path, a pressure chamber formed at the other end portion of the body and defined by the spool hole and the spool, a pilot passage for introducing pressure oil on the downstream side of the orifice into the pressure chamber, and a pressure sensing path forming part of the pilot passage, the orifice member having an oil groove formed at a portion of at least a cylindrical portion thereof at which the orifice member overlaps with the insertion hole of the connector such that, when the orifice member is inserted into the connector, the pressure sensing path of the pilot passage to the pressure chamber is formed from the oil groove.

The orifice member may have a hole formed at the center thereof and serving as a fixed orifice.

The orifice member may have a hole formed at the center thereof, and a rod may be provided at an end portion of the spool and extend through the hole of the orifice member thereby to form a variable orifice.

In the control valve, since it is constructed in such a manner as described above, if the orifice member is inserted into the connector, then the pressure sensing path is formed.

Accordingly, with the control valve, the pressure sensing path of a small size need not be formed by machining. Consequently, the time for drilling by machining is not required. Further, for connectors of different types, it is only required to insert orifice members as a common part. In this manner, the common part can be used economically. Further, since production of burrs which are produced by machining is eliminated, also the deburring step can be eliminated. Consequently, a totally significant reduction in cost can be achieved.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
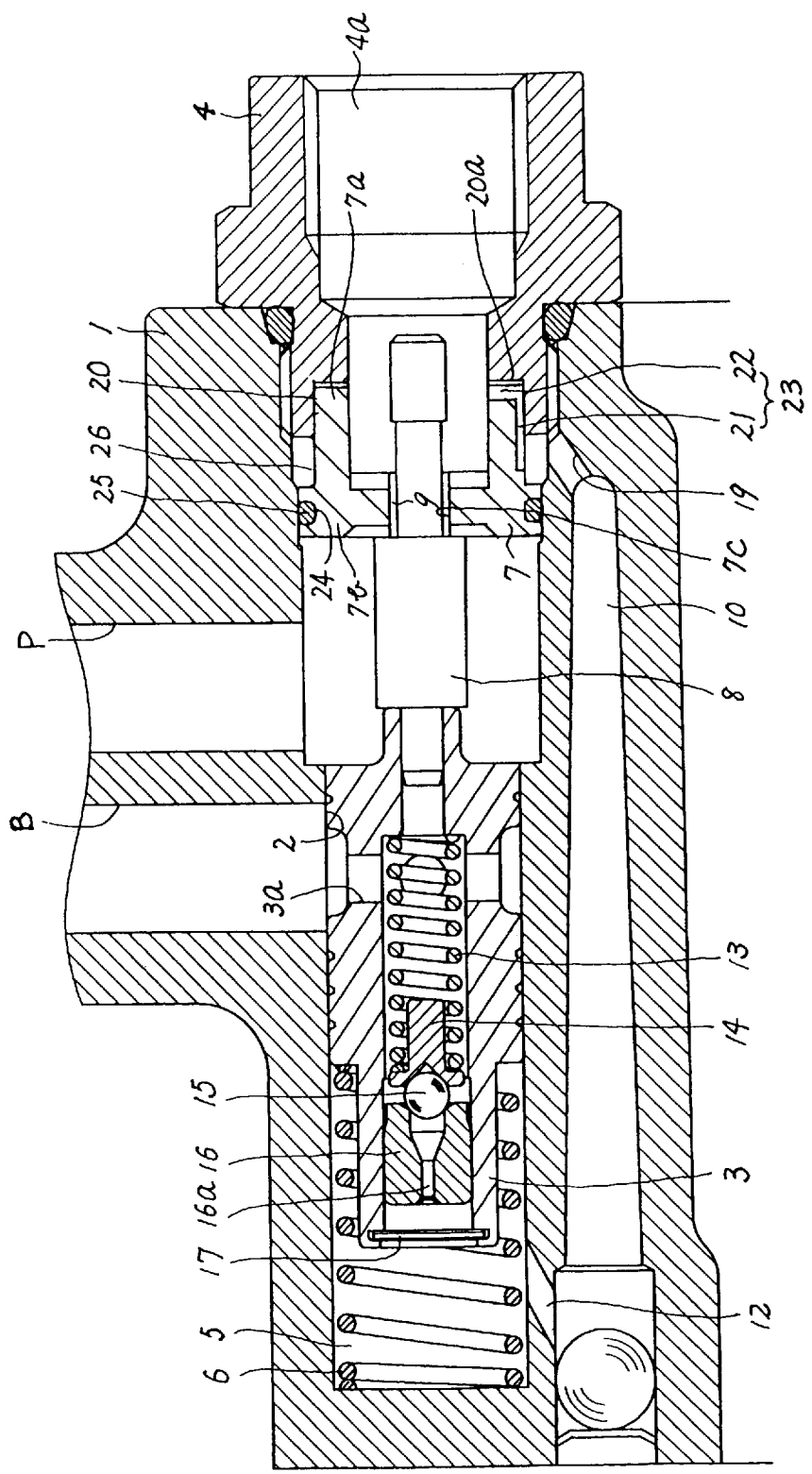
FIG. 1 is a longitudinal sectional view of a control valve showing a first preferred embodiment of the present invention.
Figure 2:
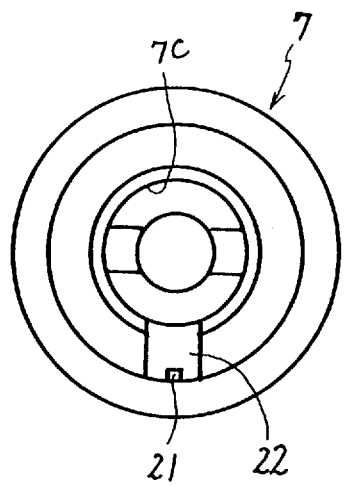
FIG. 2 is a side elevational view of an orifice member of the control valve of FIG. 1.
Figure 3:
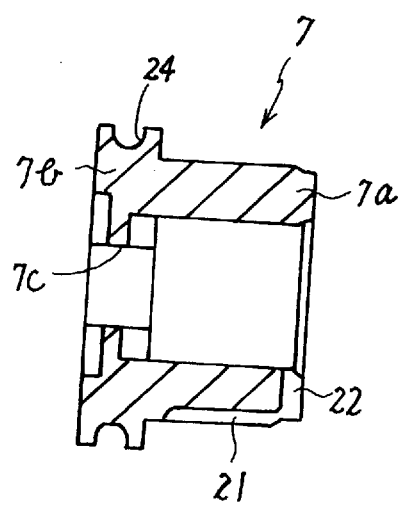
FIG. 3 is a sectional view of the orifice member of FIG. 2.
Figure 5:
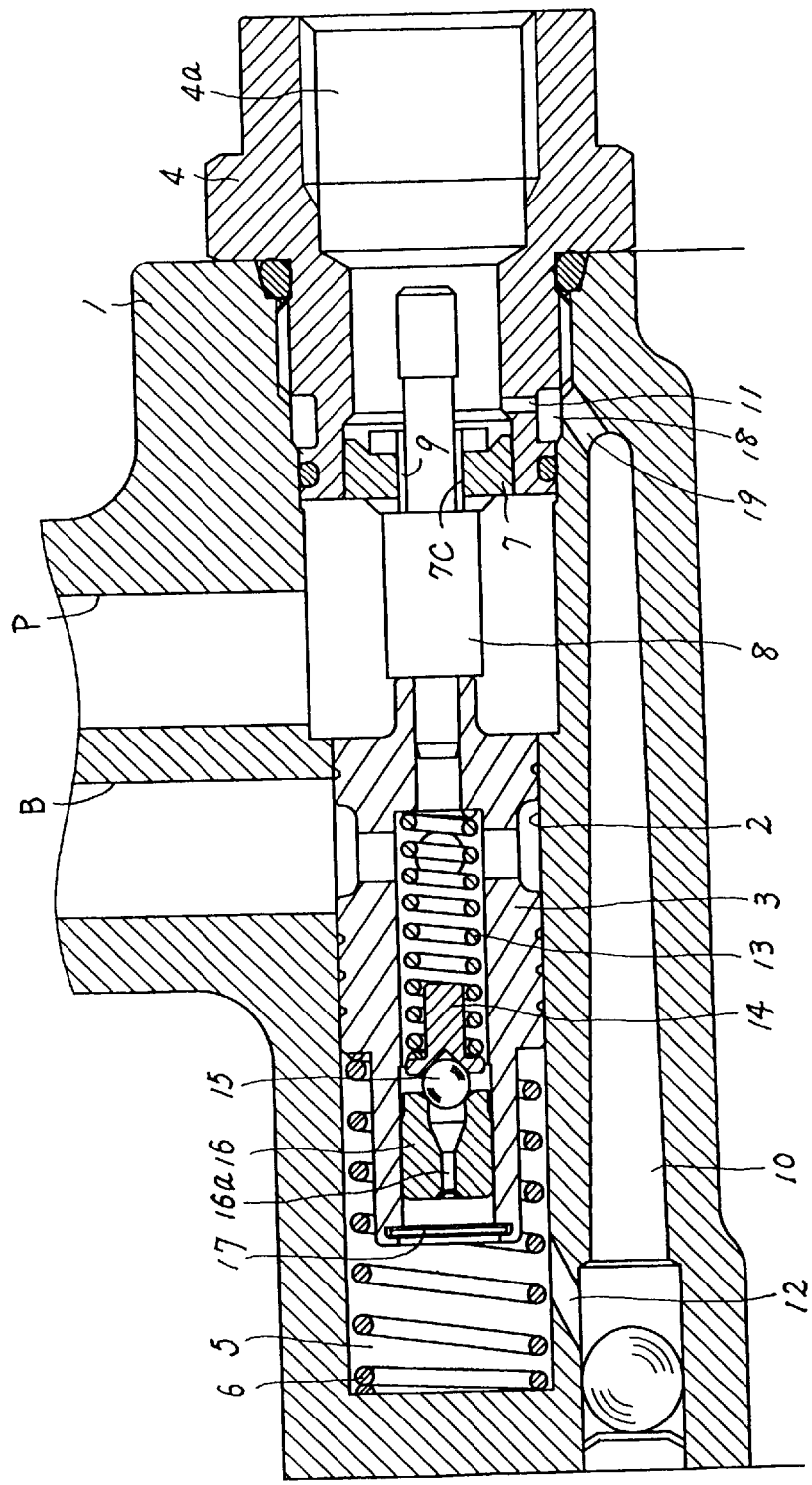
FIG. 5 is a longitudinal sectional view of a conventional control valve.

Referring first to FIGS. 1 to 3, there is shown a control valve according to a first preferred embodiment of the present invention. The control valve shown is an improvement to and includes several common components with the conventional control valve described hereinabove with reference to FIG. 5. Accordingly, overlapping description of such common components is omitted here to avoid redundancy.

The control valve includes a connector 4 and an orifice member 7 which are improved so that a pressure sensing path 23 can be formed simply.

In particular, the connector 4 has an insertion hole 20 formed therein in a continuous relationship to an actuator port 4a thereof. A stepped portion 20a is formed in the insertion hole 20. A cylindrical portion 7a of the orifice member 7 is force fitted in the insertion hole 20. The orifice member 7 is formed in the following manner.

As particularly seen in FIGS. 2 and 3, the orifice member 7 has the cylindrical portion 7a and a partition wall portion 7b. A rod 8 extends through a center hole 7c formed in the partition wall portion 7b of the orifice member 7 thereby to form a variable orifice 9. A seal groove 24 is formed on an outer periphery of the partition wall portion 7b, and a seal member 25 is received in the seal groove 24.

The cylindrical portion 7a of the orifice member 7 has an end having an outer diameter which allows the end to be force fitted into the insertion hole 20. The orifice member 7 is so shaped and sized that, when the end of the orifice member 7 is force fitted into the insertion hole 20 until it is stopped by the stepped portion 20a of the insertion hole 20, the partition wall portion 7b and the end of the connector 4 cooperatively define an annular recessed portion 26.

An oil groove 21 is formed on an outer periphery of the cylindrical portion 7a of the orifice member 7 and extends in the direction of an axial line of the cylindrical portion 7a. An end face groove 22 is formed in a radial direction on an end face of the cylindrical portion 7a such that it is communicated with the oil groove 21.

If the cylindrical portion 7a of the orifice member 7 formed in such a manner as described above is force fitted into the insertion hole 20 of the connector 4, then an overlapping portion of the insertion hole 20 with the oil groove 21 and the end face groove 22 makes a pressure sensing path 23 which is part of a pilot passage. In short, in the present embodiment, the pilot passage is formed from the pressure sensing path 23 formed from the oil groove 21 and the end face groove 22, the annular recessed portion 26, a path port 19, a communication path 10 and a hole 12.

Though not shown, the oil groove 21 may alternatively be formed on the insertion hole 20 side.

As described above, if the oil groove 21 and the end face groove 22 are formed on one of the orifice member 7 and the connector 4, then the orifice member 7 can be inserted as a common part into the connector 4, which may have any of various mouthpiece shapes, whereupon the pressure sensing path 23 is formed.

Accordingly, such machining as is required by the conventional control valve described hereinabove is not required to form a pressure sensing path for introducing an oil hydraulic pressure on the downstream side of the variable orifice 9 as a pilot oil hydraulic pressure, and the grooves 21 and 22 can be formed simultaneously upon molding of the relevant parts.

Further, if the size of the oil groove 21 is specified, then also the size of the pressure sensing path 23 as an introduction portion of a pilot oil hydraulic pressure can be specified naturally. Besides, in this instance, since the dimensions can be specified with the mold, the management in dimension can be performed very readily.

In the control valve of the present invention, the orifice located intermediately in the flow path may have any construction. While a variable orifice is employed in the embodiment described, a fixed orifice may be employed instead as in a control valve of a second preferred embodiment of the present invention shown in FIG. 4.

The control valve of the second embodiment is a modification to and includes several common components with the control valve of the first embodiment described hereinabove with reference to FIGS. 1 to 3. Here, description is given only of the differences of the control valve of the present embodiment from the control valve of the preceding embodiment to avoid redundancy in description.

Figure 4:
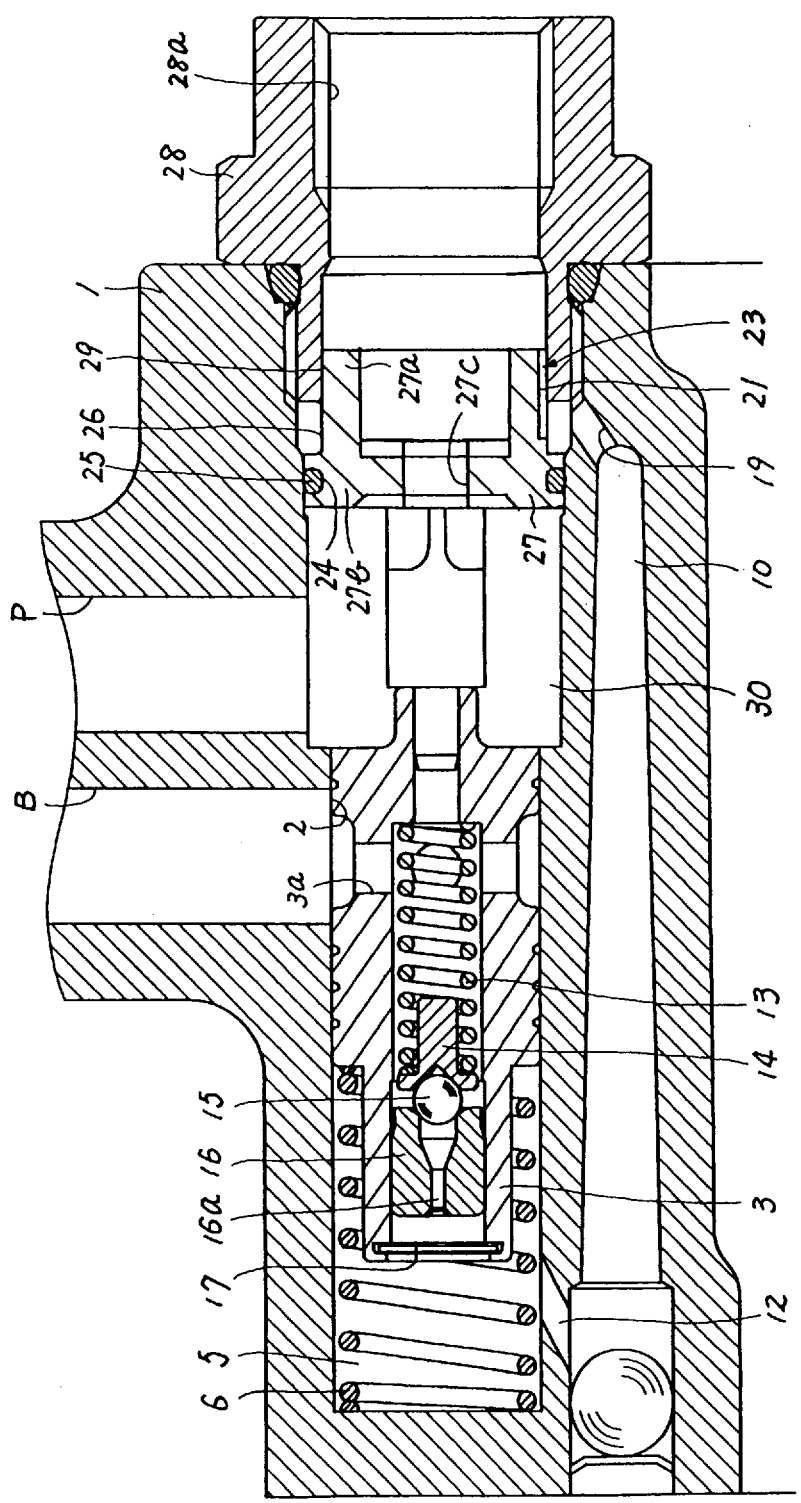
FIG. 4 is a longitudinal sectional view of another control valve showing a second preferred embodiment of the present invention.

Referring to FIG. 4, a fixed orifice member in the present embodiment is denoted at 27 and has a cylindrical portion 27a and a partition wall portion 27b. A center hole 27c is formed in the partition wall portion 27b. When oil passes through the center hole 27c, a pressure difference is produced between the opposite sides of the center hole 27c. In other words, the center hole 27c functions as a fixed orifice. A seal groove 24 is formed on an outer periphery of the partition wall portion 27b, and a seal member 25 is received in the seal groove 24.

An oil groove 21 is formed on an outer periphery of the cylindrical portion 27a of the fixed orifice member 27 such that it extends in the direction of an axial line of the cylindrical portion 27a.

Further, in the control valve of the second embodiment, a connector 28 has an insertion hole 29 formed therein in a continuous relationship to an actuator port 28a thereof. The cylindrical portion 27a of the fixed orifice member 27 is force fitted in the insertion hole 29. The insertion hole 29 does not have such a stepped portion as the stepped portion 20a of the control valve of the first embodiment.

If the cylindrical portion 27a of the fixed orifice member 27 having the construction described above is force fitted into the insertion hole 29 of the connector 28, then a portion of the insertion hole 29 which overlaps with the oil groove 21 forms a pressure sensing path 23 which is part of a pilot passage.

It is to be noted that a rod 30 functions, in the control valve of the second embodiment, as a stopper for restricting rightward movement of a spool 3 in FIG. 4.

In this manner, also where a groove is formed on an outer periphery of at least a cylindrical portion of an orifice member, it may function as part of a pressure sensing path.

Having now fully described the invention, it will be apparent to one of ordinary skill in the art that many changes and modifications can be made thereto without departing from the spirit and scope of the invention as set forth herein.

What is claimed is:

1. A control valve, comprising:
    a body having a pump port and a bypass port formed therein and further having a spool hole formed therein, said body having first and second end portions;
    a spool fitted for sliding movement in said spool hole of said body;
    a connector having an inner surface defining an insertion hole, said connector being inserted in said first end portion of said body and forming a flow path together with said pump port and said spool hole;
    an orifice member having an outer surface inserted in the insertion hole of said connector for providing an orifice intermediately in said flow path;
    said second end portion of said body having a pressure chamber defined by said spool hole and said spool;
    said control valve further comprising a pilot passage for introducing pressure oil on a downstream side of said orifice into said pressure chamber; and
    a pressure sensing path forming part of said pilot passage and defined by a portion of the outer surface of said orifice member and a portion of the inner surface of said connector.

2. A control valve as claimed in claim 1, wherein said orifice member has a hole formed at the center thereof and serving as a fixed orifice.

3. A control valve as claimed in claim 1, wherein said orifice member has a hole formed at the center thereof, and a rod is provided at an end portion of said spool and extends through said hole of said orifice member thereby to form a variable orifice.

4. The control valve as in claim 1, wherein said orifice member comprises a partition wall portion and a cylindrical portion, said cylindrical portion having an end portion being structured and arranged to be fitted into the insertion hole of said connector.

5. The control valve as in claim 4, wherein said pressure sensing path comprises an end face groove defined by an end face of said cylindrical portion of said orifice member and said inner surface of said connector and an oil groove defined by an outer peripheral surface of said orifice member and an inner peripheral surface of said connector such that the end face groove and the oil groove are substantially perpendicular to one another and are in fluid communication with one another.

6. The control valve as in claim 1, wherein said pressure sensing path is defined by a groove formed in at least one of the outer surface of said orifice member and the inner surface of said connector.

7. The control valve as in claim 6, wherein said pressure sensing path is defined by a groove formed in the outer surface of said orifice member.

8. The control valve as in claim 6, wherein said pressure sensing path is defined by a groove formed in the inner surface of said connector.

9. The control valve as in claim 6, wherein said pressure sensing path is defined by a groove formed in each of the outer surface of said orifice member and the inner surface of said connector.

10. A control valve, comprising:
    a body having a pump port and a bypass port formed therein and further having a spool hole formed therein, said body having first and second end portions;
    a spool fitted for sliding movement in said spool hole of said body;
    a connector having an inner surface defining an insertion hole, said connector being inserted in said first end portion of said body and forming a flow path together with said pump port and said spool hole;
    an orifice member having an outer surface inserted in the insertion hole of said connector for providing an orifice intermediately in said flow path;
    said second end portion of said body having a pressure chamber defined by said spool hole and said spool;
    said control valve further comprising a pilot passage for introducing pressure oil on a downstream side of said orifice into said pressure chamber; and
    a pressure sensing path forming part of said pilot passage and defined between a portion of the outer surface of said orifice member and a portion of the inner surface of said connector.

* * * * *